(12) United States Patent
Punthakey

(10) Patent No.: US 9,181,795 B2
(45) Date of Patent: Nov. 10, 2015

(54) GROUNDWATER MANAGEMENT SYSTEM

(71) Applicant: Jehangir Framroze Punthakey, Lindfield (AU)

(72) Inventor: Jehangir Framroze Punthakey, Lindfield (AU)

( * ) Notice: Subject to any disclaimer, the term of this patent is extended or adjusted under 35 U.S.C. 154(b) by 234 days.

(21) Appl. No.: 13/693,617

(22) Filed: Dec. 4, 2012

(65) Prior Publication Data

US 2013/0160997 A1 Jun. 27, 2013

(30) Foreign Application Priority Data

Dec. 5, 2011 (AU) .................. 2011905051
Jan. 6, 2012 (AU) .................. 2012900052

(51) Int. Cl.
  *E21B 41/04* (2006.01)
  *E21B 47/00* (2012.01)
  *E03B 1/00* (2006.01)
  *E03B 3/16* (2006.01)
  *E21B 41/00* (2006.01)
  *G01V 9/02* (2006.01)

(52) U.S. Cl.
  CPC . *E21B 47/00* (2013.01); *E03B 1/00* (2013.01); *E03B 3/16* (2013.01); *E21B 41/0092* (2013.01); *G01V 9/02* (2013.01)

(58) Field of Classification Search
  CPC ....... E21B 47/04; E21B 41/0092; G01V 9/02; E03B 3/16; E03B 1/00
  USPC .......................................................... 703/10
  See application file for complete search history.

(56) References Cited

U.S. PATENT DOCUMENTS 5,468,088 A * 11/1995 Shoemaker et al. .......... 166/245
5,639,380 A * 6/1997 Misquitta ...................... 210/739
5,729,206 A * 3/1998 Divens ........................... 340/618
6,338,466 B1 * 1/2002 Wallace et al. ................ 251/62
6,782,321 B1 * 8/2004 Burton ............................ 702/5
2009/0076632 A1* 3/2009 Kram et al. ................... 700/33
2010/0193183 A1* 8/2010 Lambie et al. .......... 166/250.15

OTHER PUBLICATIONS

Bryce Kelly, Groundwater Knowledge ad Gaps in the Condamine Alliance Area, Oct. 2007, National Centre for Groundwater Management; University of Technology, Sydney, p. 12.*
Wikipedia: "Bollinger Bands"; http://en.wikipedia.org/wiki/Bollinger_Bands.*

* cited by examiner

*Primary Examiner* — Robert E Fuller
*Assistant Examiner* — Christopher Sebesta
(74) *Attorney, Agent, or Firm* — Nath, Goldberg & Meyer; Joshua B. Goldberg; Christopher Thomas

(57) ABSTRACT

The invention relates to a method of managing ground water resources, where bores are used to extract ground water such as for agricultural, mining and town water supply purposes. It involves a method for managing a groundwater resource including, providing at least one production bore that is adapted to extract groundwater from an aquifer, providing at least one monitoring bore that provides a measure of the extraction capability of removing water from the aquifer, measuring the hydraulic head of groundwater in the aquifer by means of the monitoring bore, and monitoring at least one indicator of the capability of extracting groundwater from the bores. The method involves determining at least one trigger point at which further monitoring of, or action in respect of, the groundwater extraction is to be undertaken, and intervening when this trigger point is reached during groundwater extraction. Preferably there are at least two trigger points; one to trigger a review and another that triggers management action.

10 Claims, 5 Drawing Sheets

GROUNDWATER MANAGEMENT SYSTEM

TECHNICAL FIELD

The present invention relates to a method of managing ground water resources, where bores are used to extract ground water such as for agricultural mining and town water supply purposes. Generally, a number of bores will be used to extract groundwater from an aquifer, and the management of the extraction process will require care so as to ensure that the water resource is not depleted or overused. The aquifer is a complex and dynamic system, with replenishment occurring at the same time as the drawdown. The refilling of the aquifer is affected by rainfall, and interaction with river systems, while the pumping of water from boreholes in the aquifer is also not the only diminishment taking place, because natural discharge and evaporation and transpiration by vegetation also plays a part.

The present invention proposes a method of managing groundwater resources which supply water from boreholes in an aquifer, where there are production boreholes to extract water, and one or more monitoring bores that provide an indication of the capacity of the aquifer to supply water. The data obtained from the monitoring boreholes is collected and analysed using various techniques. The current invention provides some new technical analysis tools for determining the water supply capability of the aquifer and more importantly, utilising and determining suitable trigger points where further action is to be taken so as to maintain the aquifer in good health.

BACKGROUND TO THE INVENTION

Ground water has always been an important resource, and wells have been used through all of history to provide water for people to use for drinking, washing and so forth, and for agricultural uses. It has always been important to monitor the level of water in wells and to learn if the water table is falling because of a decrease in water being supplied to the aquifer or because of overuse of the ground water. The water table will fluctuate according to seasonal variations in rainfall and the many other factors. It has always been difficult to monitor the capacity of a water supply source to provide water, because of the complexity both in determining the inflow and outflows from the aquifer.

In modern times, water is pumped from bores that draw water from aquifers, and so it is easy to remove too much water. Generally many bores may share an aquifer and any one bore can deplete the aquifer in different ways from the others in the array, because the factors involved in water replenishment can vary considerably across all the bores, due to geographic features of the aquifer, the arrangement of rivers and streams on the surface, and different rainfall patterns over the area, for instance.

Monitoring bores are often drilled at a distance to the production bores, and are used to measure the head of groundwater, which is a measure of the level of the groundwater in the bore or the water pressure. In the past, water levels from monitoring bores often used to be measured once every six months or so. This was often done by measuring the water level inside a hollow, water-filled casing sunk into the ground, which has slots at its base to admit the water. A person would lower a weight on a tape measure, called a "plopper" that makes a noise when it touches the water surface, allowing the depth of water from the top of the casing to the water surface to be calculated. In more recent times, an electronic "logger" is often used, which achieves the same result, but which can also be wired to transmit the results to a base station. In the past, loggers were very rare or too expensive or often too unreliable to be much used, but in recent times the problems with using loggers have been overcome, and they are now becoming common. The measurements collected by these means are collated and then mapped using contouring so as to understand the flow conditions in an aquifer.

With the advent of loggers, it is now possible to precisely measure water levels on a continual basis, such as at daily, or hourly intervals or continuously, for example. The data can still be used to make water level maps which help to understand the direction of flow. However, with the greater use of loggers it is possible to get better quality and quantity of data, which can then be analysed in a number of ways.

In accordance with the invention, one avenue is to use this data as a new source of input for predictive modelling. Previously the data was plotted from individual bores (time series data) to understand how a particular point in the aquifer is behaving. It is now proposed, according the invention, is to use this data to quantify the level of stress that is being imposed on the aquifer system.

Accordingly, it would be useful to provide a solution that avoids or ameliorates any disadvantage present in the prior art, or which provides another and new alternative to the prior art approaches.

SUMMARY OF THE INVENTION

One aspect of the invention provides a method for managing a groundwater resource, or in other words, to manage the level of groundwater stress. This method has the steps of:—providing at least one production bore that is adapted to extract groundwater from an aquifer, providing at least one monitoring bore that provides a measure of the extraction capability of removing water from the aquifer, measuring the hydraulic head of groundwater in the aquifer by means of the monitoring bore, and monitoring at least one indicator of the capability of extracting groundwater from the bores. The method is characterised by the further step of determining at least one trigger point at which further monitoring of, or action in respect of, the groundwater extraction is to be undertaken, and intervening when that trigger point is reached during groundwater extraction, to further monitor the aquifer, or to take action by varying the rate of groundwater extraction, or to do both. Varying the rate of groundwater extraction includes ceasing the extraction, ie, where the rate or extraction becomes zero.

Preferably this method is characterised by the further steps of determining at least one first trigger point at which further monitoring of the groundwater extraction is to be undertaken, determining at least one further trigger point at which a change in the management of the groundwater system (such as the rate of groundwater extraction) is to be undertaken, and intervening whenever either of the trigger points is reached during groundwater extraction.

Additional preferred features are outlined in the claims at the end of this document, and are described in more detail in the description below.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

Figure 1:
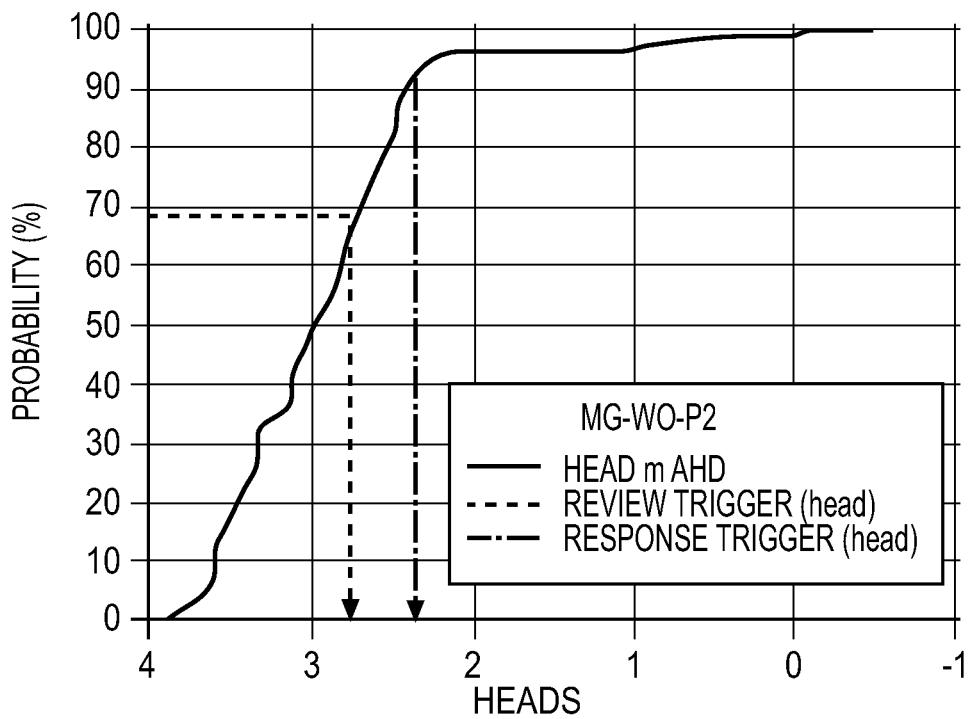
FIG. 1 is a graph showing probability versus hydraulic head for an example bore.

In general terms, the invention involves a method for managing stress on a groundwater resource. In preference, this management will utilise the steps of: providing an array or series of bores that are adapted to extract groundwater from an aquifer, monitoring the hydraulic head of groundwater in at least some of the bores, and monitoring at least one indicator of the capability of extracting groundwater from the bores, such as monitoring a response of the groundwater system to the extraction that is occurring, such as water levels, for instance, or other indicators of this.

There may be a single bore involved, or a number of bores. Generally the bores will be split into production bores and monitoring bores. There should ideally be at least one production bore and at least one monitoring bore. However, an old production bore may be converted to be a monitoring bore, and so this definition should be interpreted broadly. A production bore is usually monitored for pumping rather than water levels, but in some cases there may be a need to monitor drawdown at the production bore. So sometimes it could be that a production bore is also used for monitoring.

There are also artesian (flowing) bores like in the Great Artesian Basin. These bores do not require a pump to be fitted as the groundwater flows due to it being at high pressure. In this case, there may be a need to monitor the pressure level in the aquifer (and in this case it is not a water level but a pressure head). Falling pressures have been the reason for the government to recently introduce capping schemes for artesian bores to prevent wastage of water and to preserve pressures. A production bore is always a bore and this is different to a spring, although there are cases where a production bore may be tapping a spring.

Ideally, there are a significant number of production and monitoring bores involved. The bores generally relate to one aquifer, but these systems are complex, and often interact, and so the definition of aquifer should be interpreted broadly. Generally speaking, an aquifer is a geological layer capable of transmitting a significant quantity of water. In contrast, an aquitard is a layer that impedes the flow of groundwater. An unconfined aquifer is one that is open to the atmosphere, whereas a confined aquifer is bounded below and above. Consolidated sediments are materials that have been metamorphosed or cemented together, like limestone and sandstone. Groundwater flows through fracture networks in these consolidated sediments. Unconsolidated sediments are sediments ranging from clay to sand to gravel, with connected pore spaces that allow groundwater to be stored and transported. Generally coastal plains can consist mainly of unconsolidated sediments. Confined aquifers can be both consolidated or unconsolidated. For example, in Australia, the confined alluvial aquifers in the Murrumbidgee are unconsolidated whereas the confined aquifers of the Hawkesbury Sandstone are consolidated, and these can also be referred to as being a consolidated aquifer.

The method of the invention is further characterised by the steps of: determining a trigger point, or preferably at least one first trigger point at which further monitoring of the groundwater extraction is to be undertaken, and also preferably determining at least one further trigger point at which a change in the management of the groundwater system such as the rate of groundwater extraction is to be undertaken. Then there is to be some intervention whenever any of the trigger points is reached during groundwater extraction.

The method is used as a means to measure and analyse the level of stress for an aquifer system and to provide an early warning system for evaluating groundwater stress to allow resource managers to implement an appropriate management response.

Various indicators can be monitored. One preferred approach to achieve this is where technical analysis utilises a band that is analogous to the Bollinger Bands used in financial markets. In this case, preferably the band is based on a central tendency that is a moving mean, and the band has an interval from the central tendency which is a measure of volatility being a moving standard deviation, the mean and standard deviation being derived from data of the capability of extracting groundwater, or in other words, derived from measured water level data in response to extracting ground water.

Figure 2:
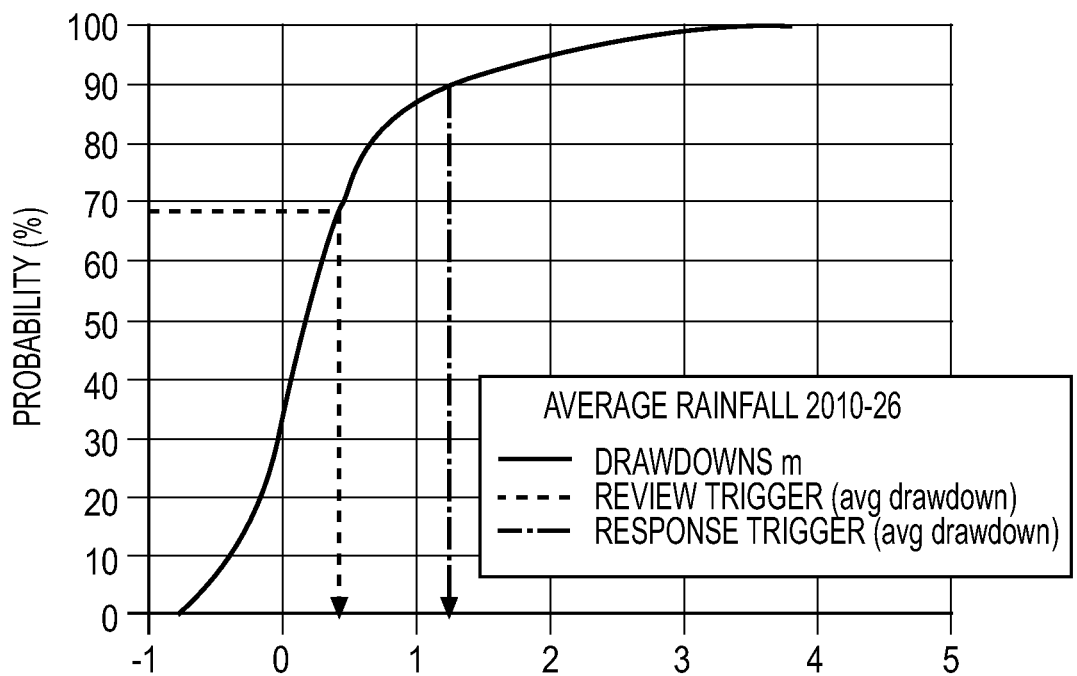
FIG. 2 is a graph of probability versus drawdown for an average rainfall scenario.

The first of the trigger points may be set at a standard deviation calculated from a statistical analysis of the probability distribution. For example, as shown in FIGS. 1 and 2 the Review Trigger is selected around 68%. The second of the triggers, the Response Trigger may be set at a higher level, such as at 90% probability level. Other cut-off points for the triggers may be selected. Preferably the Review Trigger may be set in the range of 50% to 80%, and the further, Response Trigger may be set in the range of from 80% to 99%. Or two or more triggers of each of these types may be set in this range. The trigger points selected may also be different according to the type of aquifer, weather conditions, time of year, or purpose of the groundwater extraction, or with appropriate selection of triggers for areas with readily or cheaply available alternate water supplies, for instance.

At the first trigger (Review Trigger), steps are to be taken to intensify the monitoring that is taking place. This can involve initiating closer monitoring of the site. This functions as an early warning that there is a need to review the data gathered from the bore more frequently, for example. A manager may have to manage several borefields with many monitoring bores. So tripping this trigger helps to focus the manager's attention on the most important bores. More frequent monitoring and reporting may be one possible outcome. It could also mean that in this area the manager may need to instrument more monitoring bores with loggers so that there is greater and better coverage of the area.

At the further trigger (Response Trigger) the intervention is more definitive, and may involve reducing or ceasing the extraction of groundwater from the aquifer. It may also or instead involve recharging the aquifer, by redirecting water from other sources to the aquifer. This generally means there is a need to initiate some management action. This may include one or more actions. The manager can reduce the water extraction from one or more production bores in the vicinity of the monitoring bore. The manger may introduce managed aquifer recharge schemes for the area. Or the manager may introduce across-the-board cuts in pumping. A further option is to change the spatial extraction so that there is less impact in the area where the Response Trigger has been reached.

While it is preferred there be two triggers, a review and a response type trigger, there may just be one, or there may be a range of triggers, ideally of increasing severity of response.

In general, the procedure operates by firstly taking data from monitoring bores and working out Review and Response Triggers. This may preferably involve using data from a specific period, such as 2008-2010, or example. Then some evaluation of monitoring data in the following year, ie 2011, is done to see if water levels are breaching the Review or Response triggers. If it turns out the Review Trigger is breached then the manager would initiate closer scrutiny of the site. If the response trigger is breached then the manager would initiate a management response which could be any of things mentioned previously, such as reduced pumping, managed aquifer recharge, and so forth.

Preferably, the data is collected on a frequent basis, by means of a data logger device, so as to enable enhanced analysis, due to the quantity of data thus made available. But manually collected data is also acceptable, and historical data is also able to be included. This data is infrequently collected, but may be available for longer time periods, which affords useful analysis. Continuous data loggers are very appropriate for use with the invention. Where water level data is not available a groundwater model may be used in place of loggers to simulate the data required to calculate the triggers.

The probability measures for setting off the triggers utilize statistical analysis techniques.

The values for the probability distribution come from analysis of the data collected by the loggers which are installed in monitoring bores. The pumping rates can and do vary with time. The monitoring bore will reflect these changes in the variation of the water levels. In some instances where there are sufficient monitoring bores it is possible to construct a groundwater "model" of the aquifer system. By doing so, the response can be simulated at any point in the aquifer. Once such output is obtained from the model, an analysis of the Review and Response Triggers can be made.

It is possible to analyse the Review and Response Triggers for a single monitoring bore. This involves using time series data on water levels that have been measured over a specified period. It is also possible to look at managing a zone which may involve several bores aggregated together over a specified time period so that a Review and Response Trigger can also be developed for a zone. This may be a good way to manage a very large aquifer where it may be too costly to keep track of every monitoring bore. It is also reasonable to do both of the above using model generated data. So for instance, there may not be sufficient funds to install additional monitoring bores but by using a groundwater model a target location can be picked where there is no monitoring bore, and then the model response there can be examined so as to give meaningful results.

A groundwater model can be constructed for an aquifer system provided there is sufficient data as an exploratory tool so as to better understand the groundwater response. This model is generally constructed using information about the aquifer such as the thickness of the aquifer and the type of geological material the aquifer is made up of, and using system inputs and outputs such as rainfall evapotranspiration, river-groundwater interaction and pumping etc. More precisely, it is generally important to incorporate such items as: pumping, rainfall, evapotranspiration, river and groundwater interaction, drainage, etc. Once the model is developed and calibrated it can be used for predictive purposes. Calibration involves ensuring there is reasonable match between the model output and water levels measured in a monitoring bore. Once a calibrated model is obtained, then it is possible to determine, for example, what will happen in 2020 subject to the following scenarios: an increase in pumping by 20 percent, or a decrease in rainfall by 10 percent, or any other scenario.

In the method of the invention, preferably a model is developed from a large quantity of aquifer, climate and system data over a significant time period, which is then used to evaluate the setting of trigger points. Ideally this method may involve, incorporating data for one or more of: pumping, rainfall, evapotranspiration, river system, groundwater interaction and natural drainage/discharge. It is also preferred that the model is used to predict the future outcome of different scenarios by altering one or more of: pumping, rainfall, evapotranspiration, river system, groundwater interaction and natural drainage, for the aquifer.

More specifically, the method can utilise the application of indicators in order to provide early warning of the onset of stress on the groundwater system for an aquifer. The indicators may include Sustainability Bands, MACD (Moving Average Convergence/Divergence), and Volatility indicators, that are adapted from technical indicators used in the financial markets by analysts and traders. To allow quantitative assessment of indicators, preferably two triggers are used: a Review Trigger which signals the need for enhanced monitoring and surveillance and a Response Trigger which signals the need for a management response to minimise an undesirable impact on the resource. In addition, an "Aquifer Stress Index" measure can be used to assess potential hotspots and to assess the level of stress being imposed on the aquifer in response to climatic or anthropogenic stresses.

The application of these triggers along with financial-type indicators applied to aquifers can be used to identify a number of locations in the vicinity of borefields that require close monitoring, and in some cases need management responses. This will usually depend on the level of pumping stress being imposed. The use of monitoring data for water levels at selected sites in the borefields, along with the application of these triggers can also be used to show seasonal impacts which may cause water levels to decline below the Review Trigger, which would require closer scrutiny of the site and/or when water levels decline below the Response Trigger thereby alerting the water resource manager to undertake some kind of management response.

EXAMPLES

Some tests are carried out using these triggers for three climate scenarios for average, low, and high rainfall conditions that show that during periods of low rainfall or drought conditions the water levels in many of the bores within the influence of the production bores show declines that breach the Review Trigger and for short periods the Response Trigger requiring continued monitoring of the borefield, and so provide an early warning system when the groundwater system is likely to be severely impacted such as by periodic droughts.

Two triggers, a Review Trigger and a Response Trigger can be used according to the invention for managing complex systems such as a groundwater system. Monitoring of data collected from borefields demonstrate the application of triggers along with financial market-type indicators, such as Sustainability Bands and other MACD (Moving Average Convergence Divergence) indicators, and volatility measures, for analysing water level trends. The indicators such as sustainability bands, MACD and volatility along with the two triggers can be applied to monitoring data. But where logger data is not available, or is insufficient, an alternative is to use models to generate data for its application with the indicators and triggers.

In these examples, both logger data as well as model-generated data using the flow and transport model can be used to demonstrate the application of the Review and Response Triggers.

Selected indicators may be used to provide early warning of the onset of stress. This aspect of the invention, in establishing triggers that can be used in the context of a single bore, or a model cell, or a region, can therefore be used to establish benchmarks for managing the system. The indicators and the two triggers can be applied to a single location in an aquifer such as a bore or a model cell, or even to a zone or an entire layer. These triggers may be tested using monitoring bore records, as well as using model generated data, which can be useful, for instance, to examine the impact of climatic risk.

One concern with using indicators such as Sustainability Bands, MACD and Volatility is the qualitative nature of the assessment. The use of benchmarks to derive a set of triggers would therefore help in understanding and defining what constitutes a high level of stress and to develop a quantitative assessment framework. In order to establish benchmark stress levels, in the following examples we use the two triggers, a Review Trigger and a Response Trigger and show how these can be determined. Note that one, or more triggers, and of a different type may instead be used, in accordance with the present invention.

In order to calculate the Review and Response Triggers we make use of an example application for Bore "MG-P2" from a borefield. In the drawings, is shown a plot of probability versus heads for bore MG-P2 in FIG. 1, and FIG. 2 shows a plot of probability versus drawdowns in this example at the end of a 15-year average rainfall scenario using historic rainfall data. Both these Figures may be used to calculate the Review and Response Triggers.

The Review Trigger is defined as the target level where the water resources manager needs to institute greater observation of that location. This benchmark level provides an early warning that may include instituting a monitoring program, or where such monitoring is in place then a review of the water levels and salinity measured at that location should be conducted. Or else it may require a review of pumping rates in that location. The review trigger ("$T_{RV}$") is designed to be an early warning, that monitoring and review of this location is required, and is shown in Equation (1):

$$T_{RV} = h_{p1} - dd_{p1avg} \quad (1)$$

Where $h_{p1}$ is the head selected at a probability of 68.2% (ie, one standard deviation) from the plot of probability versus monitored heads shown in FIG. 1, and $dd_{p1avg}$ is the drawdown selected at a probability of 68.2% for an average rainfall scenario selected from a plot of probability versus drawdown shown in FIG. 2.

The Response Trigger ("$T_{RP}$") is defined as the target where the resource manager needs to institute a management action for that location. This may include a scaling back of pumping in the vicinity of the monitoring bore, or other management actions designed to alleviate the level of cumulative stress on that location. The Response Trigger is designed to initiate a management action by the resource manager, and it is also an early warning that the system stresses have reached a level where the sustainability of the system is likely to be severely affected. The response trigger is shown below in Equation 2:

$$T_{RP} = h_{p2} - dd_{p2avg} \quad (2)$$

Where $h_{p2}$ is the head at a probability of 90% selected from the plot of probability versus monitored heads shown in FIG. 1, and $dd_{p2avg}$ is the drawdown selected from FIG. 2 at a probability of 90%.

As stated previously, the selection of a particular probability level for the Review and Response Triggers can be based on the type of aquifer, its present state of development, and its extraction regime. A more conservative set of management benchmarks can be derived by adjusting the probability levels accordingly, such as with a high risk aquifer.

Similarly the selection of $h_{p1}$ and $h_{p2}$ is dependent on the length of record of monitoring data available, generally a few years of data over an average rainfall regime would be recommended rather than using data that is biased by selection of a period with low or high rainfall. In both cases it is often important to understand the condition of the aquifer and whether it is fully developed or not. For instance, if the response to pumping results in very high drawdowns then selecting the appropriate probability level for selection of $h_{p1}$ and $h_{p2}$ needs to be considered to reflect the need for a more conservative management strategy.

Developing an understanding of the aquifer response to make a sensible selection of Review and Response Triggers is also an important part of the process. The same procedure can be used to evaluate each bore with monitoring data, and can also be used for a group of model cells such as a zone.

Figures 3, 4:
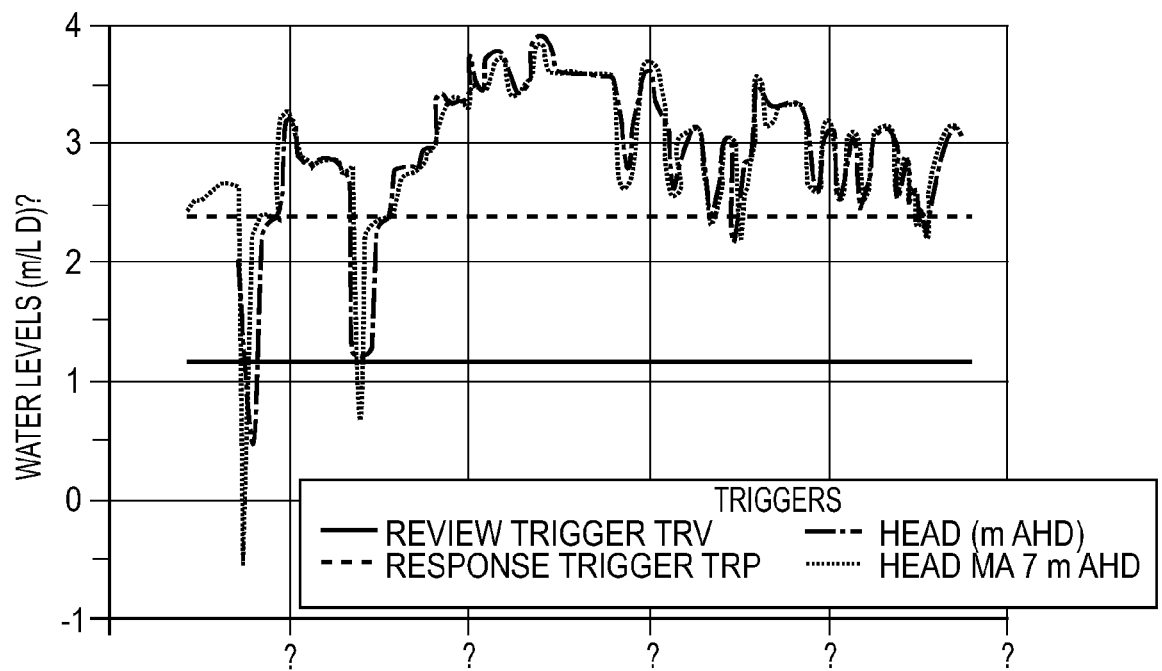
FIG. 3 is a graph of water level in meters (m) AHD with review and response triggers for an example bore.
FIG. 4 shows a conceptual model of an aquifer system having a logger inside a monitoring bore.

An example of how these triggers are utilised is shown in the drawings in FIG. 3 for Bore Mg-P2. Using Equation 1, the Review Trigger is calculated as 2.38 m AHD, and from Equation 2 the Response Trigger is calculated as 1.16 m AHD as shown in Table 1, below. The establishment of the Review and Response Triggers also allows the examination of the change at that point in the aquifer over time relative to the trigger levels as shown in FIG. 3. The review trigger is shown in FIG. 3 as the uppermost horizontal line and Response Trigger is shown as the lowermost horizontal line.

TABLE 1

| Probability | Head | Drawdown | Triggers |
|---|---|---|---|
| 68.2% | $h_{p1}$ = 2.78 | $dd_{p1avg}$ = 0.4 | Review Trigger $T_{RV}$ = 2.38 |
| 90% | $h_{p2}$ = 2.39 | $dd_{p2avg}$ = 1.23 | Response Trigger $T_{RP}$ = 1.16 |

In practice the selection of trigger levels will involve managers of the resource and water users negotiating an equitable share of the resource between competing uses and users. Where there is a high degree of confidence in the model and/or the ability of the aquifer to cope with the imposed pumping stresses then the triggers can be set using the guidelines provided here. It is important to remember that these triggers are derived using the general framework described here. Triggers can and should be reset in response to changing circumstances such as having to adapt to the impacts of climate change or to maintain the health of vital ecosystems. The application of triggers extends beyond just better management of water resources; it helps managers to account for ecosystem needs and encourages an adaptive management framework. Healthy food production systems and healthy ecosystem are a vital component of building resilience for food and water security.

The establishment and methodology for determining the Review Trigger and the Response Trigger can also be used to incorporate these triggers into embedded systems for wireless sensor networks, thus developing a new generation of loggers that have benchmark values that can be programmed into the logger systems. This will create a logger system that can be used for rapid appraisal of aquifer stress and for real time monitoring of aquifer stress. A conceptual diagram of an aquifer system showing a monitoring bore with a logger inside the bore is shown in FIG. 4. The logger can have an embedded system which will allow programming of the Review and Response Triggers to allow real time assessment of aquifer stress.

The application of indicators and triggers to monitoring data is now discussed. The key indicators used are Sustainability Bands, MACD, its signal MACDT9, Volatility and the review and response triggers. This demonstrates how these triggers can be applied to ensure sustainable management of groundwater resources.

Figure 5:
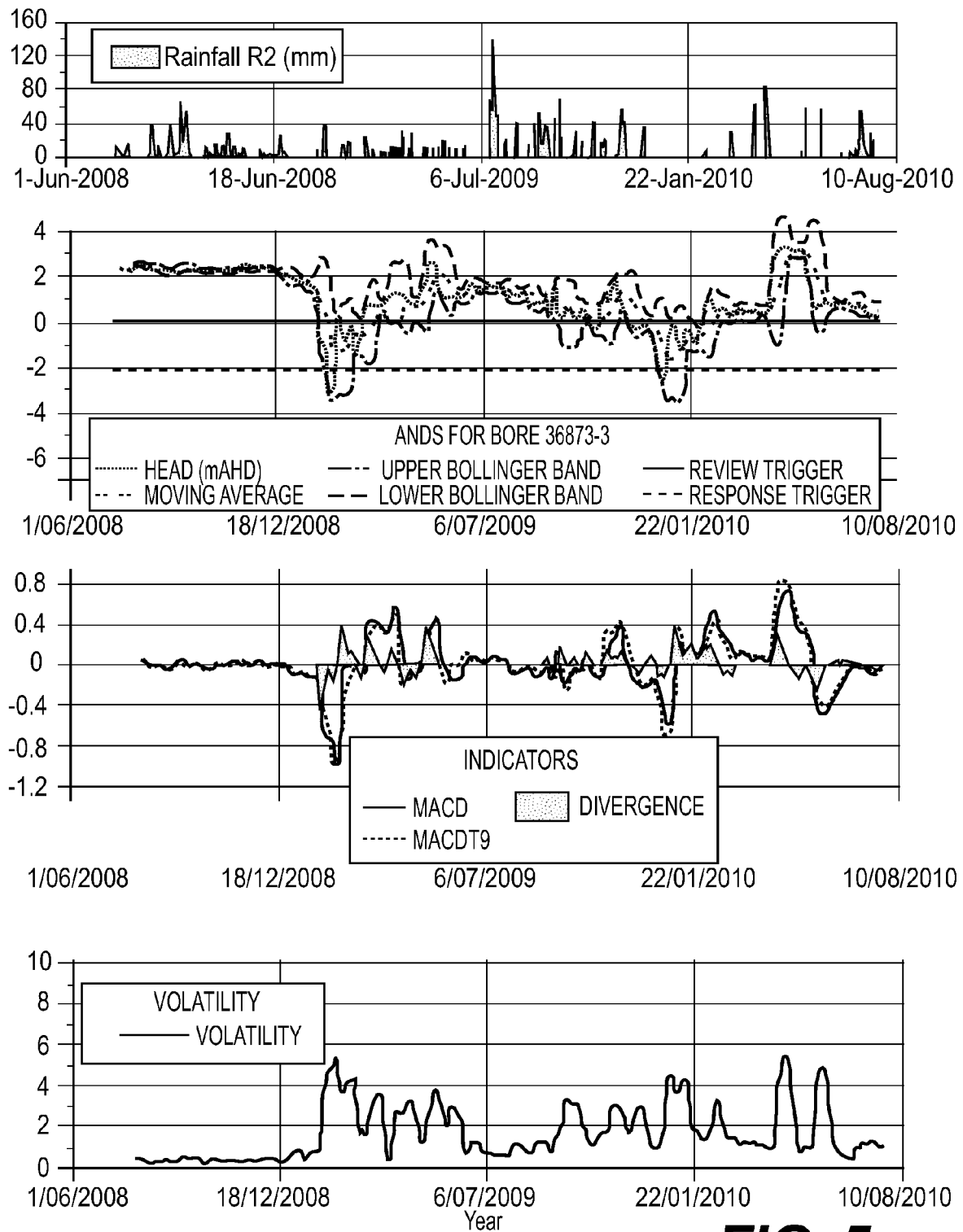
FIG. 5 shows an example of the application of Sustainability Bands, review trigger, response trigger, MACD and Volatility to water levels in the aquifer for Bore 36873, using monitoring data

FIG. 5 shows an example of the application of Sustainability Bands, MACD and Volatility to water levels (in the lower Macleay aquifer in this example) using heads measured in a bore referenced as "36873", using historical data. An increase in pumping causes a sharp decline in heads and a dramatic widening of the bands with an increase in volatility. The bands start out close to the heads from June to November, after which onset of increased pumping cause heads to fall dramatically. As the heads decline the bands widen and as the heads fall during December and January the heads tag the lower band indicating higher stress on the system. Within a relative framework we are able to indicate that stresses are high, however, with the use of triggers we can establish the severity of stress on the system, by establishing appropriate benchmarks. The review and response triggers shown in FIG. 5 indicate that from December 2008 to March 2009 and again from December 2009 to February 2010 the Review Trigger would have been breached, which suggests that close monitoring of this location would be required particularly during summer when the demand for water peaks.

FIG. 5 also shows that heads would have fallen below the Response Trigger around late January of 2009 and 2010 when there is a peak in demand, however, heads are below the response trigger only for a few days. If heads were to remain below the Response Trigger for a considerable time or if there would be a clear downward trend in water levels below the Response Trigger, then a management response such as reducing pumping rates would be warranted.

In FIG. 5 the MACD is shown falling below the trigger line (MACDT9) indicating that stress on the system would be increasing, and when these indicators fall below the zero line it would give a confirmatory signal that closer monitoring of this location would be required and that the level of stress being imposed on the system may need to be managed. There is good correlation between the information gleaned from the various indicators presented in FIG. 5. For example volatility provides a quick check that the system is experiencing rapid changes, whereas MACD gives an indication when monitoring and surveillance needs to be increased.

A modelled pumping scenario is simulated to show how the Review and Response Triggers can be applied for managing stressed groundwater systems. The pumping scenario involved simulating pumping at 50% of allocation for 5 years followed by pumping at 100% of allocation for 5 years, and subsequently followed by 5 years of pumping at 50% of allocation (hereafter referred as $P_{50-100}$ scenario) is simulated with average rainfall conditions. The heads simulated at the targets corresponding to the monitoring bore "MG-P2" are utilised to demonstrate the application of indicators and the Review and Response Triggers.

Figure 6:
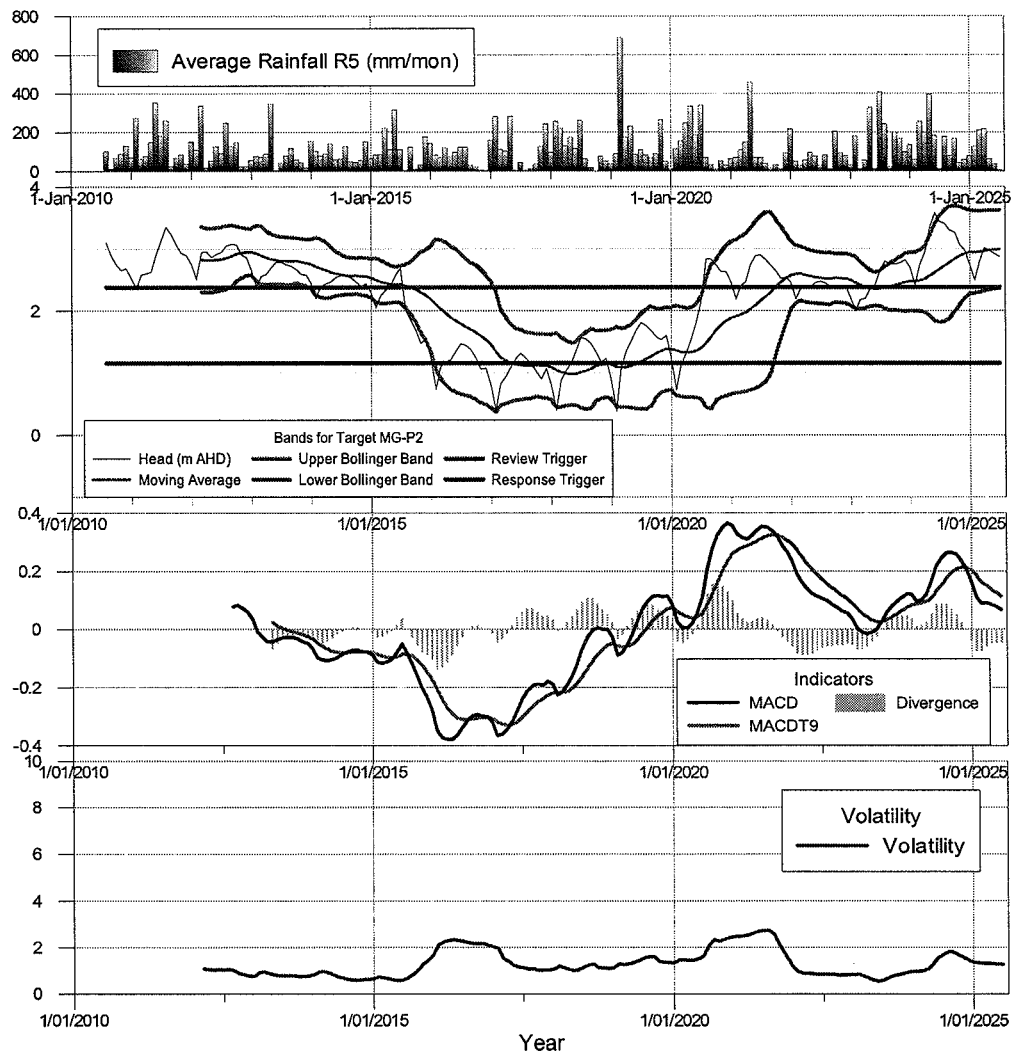
FIG. 6 shows an example of an application of Sustainability Bands, MACD (Moving Average Convergence/Divergence) and Volatility to simulated water levels in an exemplified aquifer for the $P_{50-100}$ model scenario.

In FIG. 6 the response for the $P_{50-100}$ pumping scenario shows a rapid drop in water levels to below the Response Trigger indicating pumping at a combined 50% and 100% of allocation would significantly deplete water levels for this particular aquifer and this is likely to impact on the shallow aquifer. FIG. 6 shows an acceleration of water level decline between 2015 and 2020 when rates are increased to simulate pumping at 100% of allocation, and the subsequent recovery in water levels as rates are eased back to 50 percent of allocation. The water level decline below the Response Trigger from 2016 to 2020 would indicate to the Resource Manager that a management action is required, such as a reduction in pumping rates and it also indicates at which point in time a management response would be required.

In FIG. 6 volatility is significantly higher for the $P_{50-100}$ pumping scenario as opposed to the low rainfall scenario with moderate pumping rates.

Three climate scenarios were simulated using 15 years of historic rainfall and evapotranspiration data corresponding to average, wet and dry conditions as shown in Table 2. The heads simulated at various targets corresponding to the monitoring bores are utilised to demonstrate the application of indicators and the Review and Response Triggers and how they can be applied to model generated data.

TABLE 2

| Rainfall | Period (15 years) |
|---|---|
| Low | 1901 to 1916 |
| Average | 1920 to 1935 |
| High | 1949 to 1964 |

Figure 7:
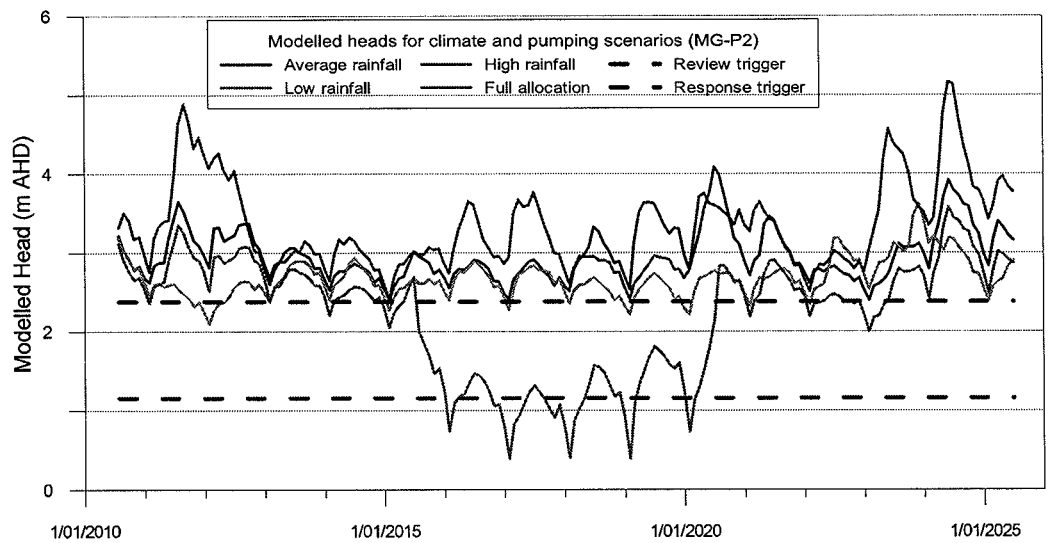
FIG. 7 shows an example of a comparison of simulated heads at location MG-P2 for climate and pumping scenarios involving the application of review and response triggers for groundwater management.

FIG. 7 compares modelled heads for three rainfall scenarios (average, low and high rainfall) and the $P_{50-100}$ pumping scenario. In FIG. 7, the simulated heads for "MG-P2" for an example aquifer is shown for the four scenarios, along with the Review and Response Triggers. Heads for the average and high rainfall scenarios are above the Review Trigger indicating the current level of pumping would not impact the aquifer adversely. For the low rainfall scenario example the heads at times briefly breach the Review Trigger but do not breach the Response Trigger which indicates that the current level of pumping could be sustained during long periods of below average rainfall. For the $P_{50-100}$ pumping scenario the extraction rates particularly from 2015 to 2020 when the production bores are operating at 100% of allocation show a rapid decline and breach of the Response Trigger. This indicates that pumping at these levels would probably have an adverse impact on the aquifer and would not be recommended. For instance the upper aquifer in the vicinity of this bore would dry out causing adverse impacts on sensitive ecosystems.

Figure 8:
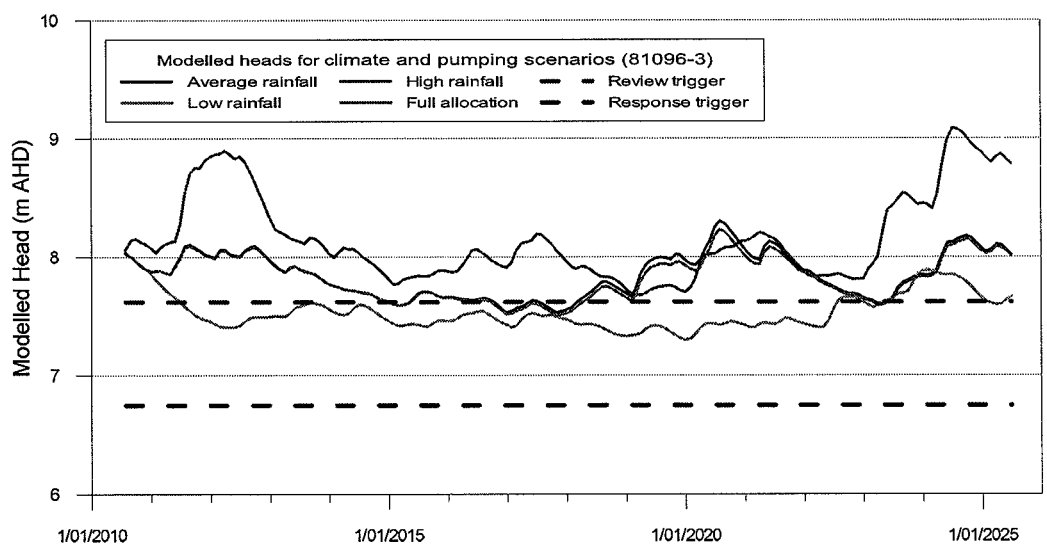
FIG. 8 shows and example of a comparison of simulated heads at location 81096 for climate and pumping scenarios indicating the application of review and response triggers for groundwater management.

Some key observations can be made from the comparison shown in FIG. 8, which is located between two borefields and outside the influence of the borefields. There is a difference between the high rainfall scenario (uppermost line) and the low rainfall scenario (lowermost line). The high rainfall scenario sits above the Review Trigger whereas the low rainfall scenario breaches the Review Trigger for most of the 15-year modelled scenario. Significantly it does not breach the Response Trigger. This indicates that the pumping from the borefields would have a very minimal impact on these scenarios as evidenced by a comparison of the average rainfall scenario with moderate pumping (thin line) versus the $P_{50\text{-}100}$ pumping scenario (centremost line) which is simulated using average rainfall conditions. Both these scenarios are almost identical which indicates that despite the very high pumping in the $P_{50\text{-}100}$ scenario, it would not have an impact on bore "81096". It can therefore be concluded that borefields are having a localised impact and are not having any impact farther away from the borefields. Secondly, climatic risks such as a prolonged period of below average rainfall and/or future climate risk that may result in lower rainfall would put greater stress on the groundwater dependent ecosystem than pumping from the borefields specifically for this location.

The analysis using Review and Response Triggers for location "81096" can also be used as a guide to suggest that in this location increased pumping could be allowed as long as the there is no breach of the response trigger.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

It will be apparent that obvious variations or modifications may be made which are in accordance with the spirit of the invention and which are intended to be part of the invention, and any such obvious variations or modifications are therefore within the scope of the invention.

INDUSTRIAL APPLICABILITY

The invention can be utilised in the area of aquifer and water resource management, for example, in the pastoral, farming, irrigation and mining industries, in the oil and gas industries such as for monitoring the impact of coal seam gas and or shale gas production on water supply aquifers, as well as in water supply to towns and cities.

The invention claimed is:
1. A method for extracting water from a groundwater resource, the method comprising:
(a) providing a production bore adapted to extract groundwater from a groundwater resource;
(b) providing a monitoring bore adapted to monitor the groundwater resource;
(c) providing a production data logger associated with the production bore, the production data logger adapted to measure a flow rate of groundwater from the groundwater resource;
(d) providing a monitoring data logger in the monitoring bore, the monitoring data logger adapted to measure a hydraulic head of water in the monitoring bore;
(e) providing a programmed system adapted to receive data from the production data logger and the monitoring data logger;
(f) receiving data into the programmed system relating to the hydraulic head of water in the monitoring bore, the hydraulic head of water in the monitoring bore being an indicator of the capability of extracting groundwater from the production bore,
(g) computing probability distributions of hydraulic head of groundwater for the production bore using the programmed system;
(h) constructing a programmed model of the groundwater resource to compute probability distributions of water drawdowns from the groundwater resource;
(i) computing hydraulic head trigger points by the programmed system for further water extraction action, the trigger points are:
(1) a review trigger point ($T_{RV}$), being

$$T_{RV} = h_{p1} - dd_{p1avg}$$

wherein
$h_{p1}$=head at a probability of between 50% and 80%; and
$dd_{p1avg}$=drawdown at probability of between 50% and 80%;
(2) a response trigger point ($T_{RP}$), being $$T_{RP} = h_{p2} - dd_{p2avg}$$

wherein
$h_{p2}$=head at a probability of between 80% and 99%; and
$dd_{p2avg}$=drawdown at probability of between 80% and 99%;
wherein
when the programmed system receives data from the data loggers that causes it to compute a trigger point $T_{RV}$, the programmed system initiates a higher frequency of data sampling in the production bore, in the monitoring bore or in both the production bore and monitoring bore; and
when the programmed system receives data that causes it to compute a trigger point $T_{RP}$, the programmed system instructs a groundwater extraction rate change by the production bore; and
(j) changing the extraction rate from the production bore.
2. The method of claim 1 wherein
$h_{p1}$=head at a probability of about 68%;
$dd_{p1avg}$=drawdown at probability of about 68%;
$h_{p2}$=head at a probability of about 90%; and
$dd_{p2avg}$=drawdown at probability of 90%.
3. The method of claim 1 having a plurality of monitoring bores.
4. The method of claim 2 having a plurality of monitoring bores.
5. The method of claim 1, wherein constructing the programmed model comprises a step of receiving data from a rainfall sensor.
6. The method of claim 1, wherein constructing the programmed model comprises a step of receiving data from an evapotranspiration sensor.
7. The method of claim 1, wherein constructing the programmed model comprises a step of receiving data from a salinity sensor.
8. The method of claim 1, comprising providing further monitoring bores having further monitoring data loggers and receiving data from the further monitoring data loggers when the Review trigger point $T_{RV}$ is reached.
9. The method of claim 1, wherein when the response trigger point ($T_{RP}$) is reached, the programmed system reduces or ceases extraction of groundwater from the groundwater resource, or increases the groundwater resource recharge.
10. The method of claim 1 including the step of computing with the programmed system, one or more sustainability bands to provide an early warning of the onset of stress on the groundwater resource such that when the response trigger point ($T_{RP}$) and a lower sustainability band cross, the programmed system instructs the reduction of pumping from the production bore.

* * * * *